(12) United States Patent
Kondo et al.

(10) Patent No.: US 7,090,383 B2
(45) Date of Patent: Aug. 15, 2006

(54) HEADLAMP ASSEMBLY WITH BLINDFOLD FOR VEHICLE

(75) Inventors: Tetsuya Kondo, Saitama (JP); Shigeru Kodaira, Saitama (JP); Yukimi Ase, Saitama (JP); Kenichiro Kuboshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 166 days.

(21) Appl. No.: 10/697,030

(22) Filed: Oct. 31, 2003

(65) Prior Publication Data
US 2005/0047165 A1 Mar. 3, 2005

(30) Foreign Application Priority Data
Nov. 12, 2002 (JP) .............................. 2002-328723

(51) Int. Cl.
*F21V 7/04* (2006.01)
(52) U.S. Cl. ...................... 362/518; 362/240; 362/241; 362/297; 362/348; 362/544
(58) Field of Classification Search ................ 362/240, 362/241, 245, 247, 304, 517, 518, 544, 297, 362/346, 348, 516
See application file for complete search history.

(56) References Cited

U.S. PATENT DOCUMENTS

| 1,394,896 | A | * | 10/1921 | Halvorson, Jr. | ............. 362/304 |
|---|---|---|---|---|---|
| 1,412,470 | A | * | 4/1922 | Kaufmann | .................. 362/517 |
| 1,751,070 | A | * | 3/1930 | Boots et al. | ................. 362/518 |
| 5,113,321 | A | * | 5/1992 | Suzuki | ........................ 362/518 |
| 5,525,856 | A | * | 6/1996 | Kawai et al. | ................ 362/517 |
| 5,944,415 | A | | 8/1999 | Kurita et al. | ................ 362/518 |
| 5,954,428 | A | | 9/1999 | Eichhorn et al. | ............ 362/543 |

FOREIGN PATENT DOCUMENTS

| DE | 19649602 A1 | 6/1997 |
|---|---|---|
| GB | 2254686 A | 10/1992 |
| JP | 2000-322923 A | 11/2000 |

* cited by examiner

*Primary Examiner*—Alan Cariaso
(74) *Attorney, Agent, or Firm*—Birch, Stewart, Kolasch, and Birch, LLP

(57) ABSTRACT

The shape of a reflector is to be made conspicuous to improve the appearance of a headlamp assembly. A headlamp assembly includes electric bulbs, a reflector, a lens and a case. Between the reflector and the case are formed gaps which result from a difference in shape between the reflector and the case. Blindfold portions are formed integrally with the reflector for filling the gaps. The blindfold members are provided with reflecting surfaces which project a black portion of the ground or of an inner surface of the case. With the reflecting surfaces of the blindfold members, a contrast is created between the blindfold member and reflecting surfaces of the reflector to make the reflecting surface shape of the reflector conspicuous.

20 Claims, 6 Drawing Sheets

HEADLAMP ASSEMBLY WITH BLINDFOLD FOR VEHICLE

CROSS-REFERENCE TO RELATED APPLICATIONS

The present application claims priority under 35 USC 119 to Japanese Patent Application No. 2002-328723 filed on Nov. 12, 2002 the entire contents thereof are hereby incorporated by reference.

BACKGROUND OF THE INVENTION

1. Field of the Invention

The present invention relates to a headlamp assembly for a vehicle and more particularly to a headlamp assembly for a vehicle having a structure for maintaining a good appearance.

2. Description of Background Art

A head lamp assembly attached to a vehicle such as a motorcycle is provided with an electric bulb and a reflector for reflecting light forward of the vehicle. A case is provided for enclosing the electric bulb and the reflector and a lens is disposed on a front side of the reflector. An example of a vehicular headlamp assembly is disclosed in Japanese Patent Laid-Open No. 2000-322923.

The shape of the reflector is determined so as to reflect light from the electric bulb in a predetermined direction. As to the shape of the case, a simple shape is adopted in many cases for the purpose of protecting the electric bulb, reflector, and lens and for decreasing the resistance of wind during operation. Therefore, the reflector and the case are not similar in shape to each other. As a result, a gap is created between the reflector and the case and the interior of the headlamp assembly is seen through the gap, thus impairing the appearance. According to countermeasures adopted heretofore, an extension member is provided to fill the gap, or the reflector portion other than the parabolic portion is projected outwards, to make the interior invisible.

However, the provision of such a separate member as the extension member results in an increase in the number of parts. Further, if the reflector is enlarged, an inherent functional portion of the reflector for reflecting light and the projecting portion of the reflector become less distinguishable from each other, with a consequent of an impairment of the appearance.

SUMMARY AND OBJECTS OF THE INVENTION

It is an object of the present invention to provide a headlamp assembly for a vehicle wherein the shape of a functional portion of a reflector is made conspicuous without increasing the number of parts, thereby improving the appearance while retaining simple look.

For achieving the above-mentioned object, a first feature of the present invention resides in a headlamp assembly for a vehicle, including an electric bulb, a reflector having a reflecting surface for reflecting light in a predetermined irradiating direction which light is generated by the electric bulb, a lens provided on a front side of the reflector, and a case disposed so as to enclose a rear portion of the reflector and supporting the reflector, wherein a blindfold member is provided to fill a gap which is formed between the case and the reflector when seen from the front side. A reflecting surface is formed on a front side of the blindfold member at an angle which is set so as to conduct light from below to ahead of the vehicle.

According to the first feature, the blindfold member reflects light from below, i.e., light from the ground, forward of the vehicle. Since the ground is generally very rough and reflects light irregularly, the amount of light reflected by the blindfold member is small. Therefore, when observed from the front side of the vehicle, the blindfold member looks black, giving rise to a strong contrast with the reflecting surface of the reflector, so that the shape of the reflector's reflecting surface looks sharp.

A second feature of the present invention resides in that two such electric bulbs as referred to above are arranged vertically side by side and the reflector has two reflecting surfaces for reflecting light in two different directions which light is generated by the electric bulbs, the two reflecting surfaces are constricted in external form at a connection where they are adjacent to each other. The blindfold member is disposed in a gap between the constricted portion and the case.

According to the second feature, in a headlamp assembly wherein the reflecting surface shape does not coincide with the front shape of the case due to the presence of two reflecting surfaces, the gap formed in the morphologically inconsistent portion can be hidden by the blindfold member. Thus, the reflecting surfaces of the reflector having a complicated shape can be conspicuous with a contrast to the blindfold member.

A third feature of the present invention resides in that a blindfold member is disposed between the case and the reflector. The blindfold member has a surface which is formed at such an angle so as to project from an inner surface of the case forward of the vehicle when the blindfold member is seen from the front side of the headlamp. A fourth feature of the present invention resides in that the inner surface of the case is black in color. According to the third and fourth features, the inner surface of the case, i.e., a dark portion, can project to the surface of the blindfold member, so that it is possible to let the blindfold member look black. Particularly, according to the fourth feature, the blindfold member can appear darker.

Further, a fifth feature of the present invention resides in that the blindfold member is integral with a front edge of the reflector. According to the fifth feature, the reflector and the blindfold member can be formed by monolithic molding for example. Thus, unlike the case where the blindfold member, as is the case with an extension member, is provided as a separate member from the reflector, it is possible to reduce the number of parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
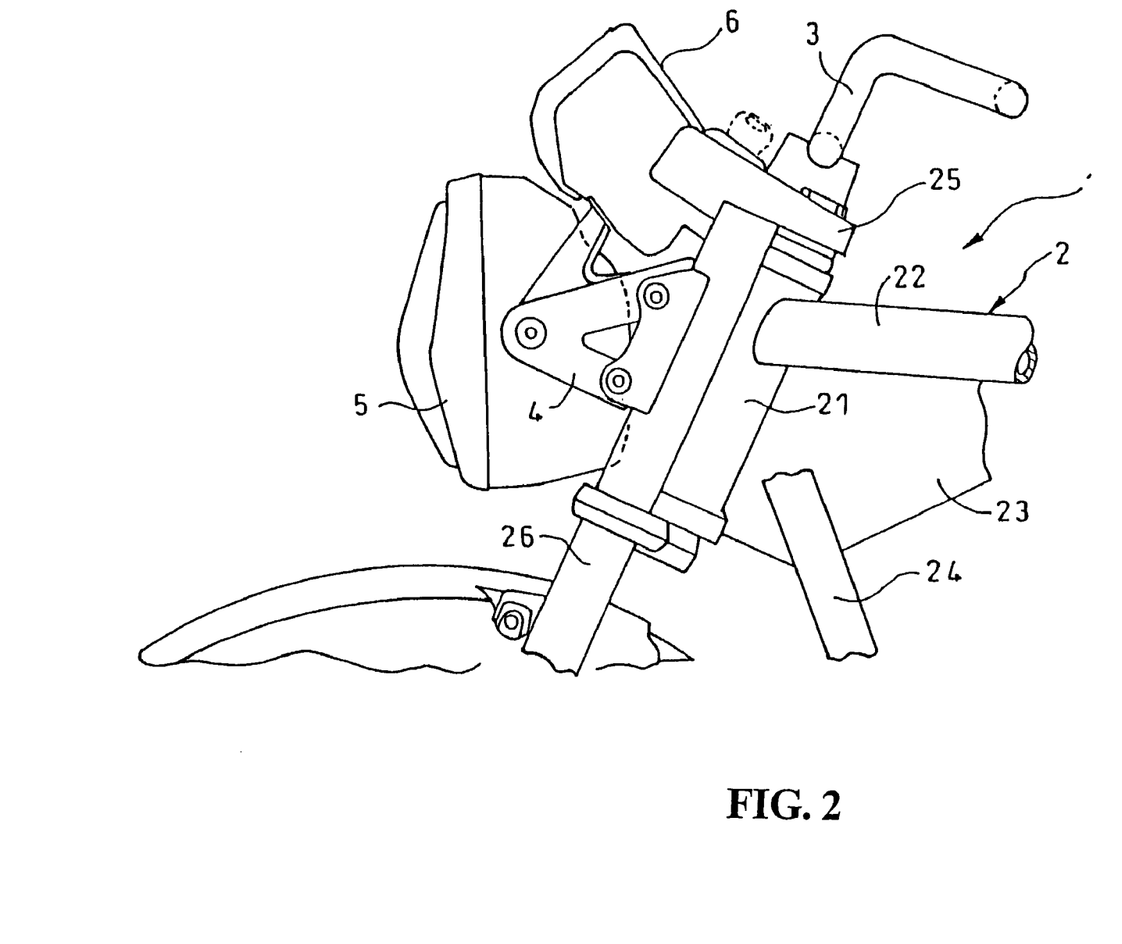
FIG. 2 is a front side view of a motorcycle including the headlamp assembly of the first embodiment.

An embodiment of the present invention will be described hereinunder with reference to the drawings. FIG. 2 is a front side view of a motorcycle including a headlamp assembly according to an embodiment of the present invention. A body frame 2 of a motorcycle 1 includes a head pipe 21 positioned on a front side of the vehicle body, a pipe-like front frame 22 extends rearwardly nearly horizontally from the head pipe 21, and a lower frame 24 extending downwardly and rearwardly from a bracket 23 which is connected to both the head pipe 21 and the front frame 22. A top bridge 25 is connected to an upper portion of the head pipe 21 and a front fork 26 which supports a front wheel (not shown) at a lower end thereof is secured to the top bridge 25. A steering handle 3 is mounted on top of the top bridge 25. A bracket 4 extends forwardly from the fork 26 and a headlamp assembly 5 is supported by the bracket 4. The headlamp assembly 5 is of a so-called uncovered type which is not covered with a fairing or the like. As to the headlamp assembly 5, a more detailed description will be given. An instrument panel 6 is disposed above and behind the headlamp assembly 5.

Figure 1:
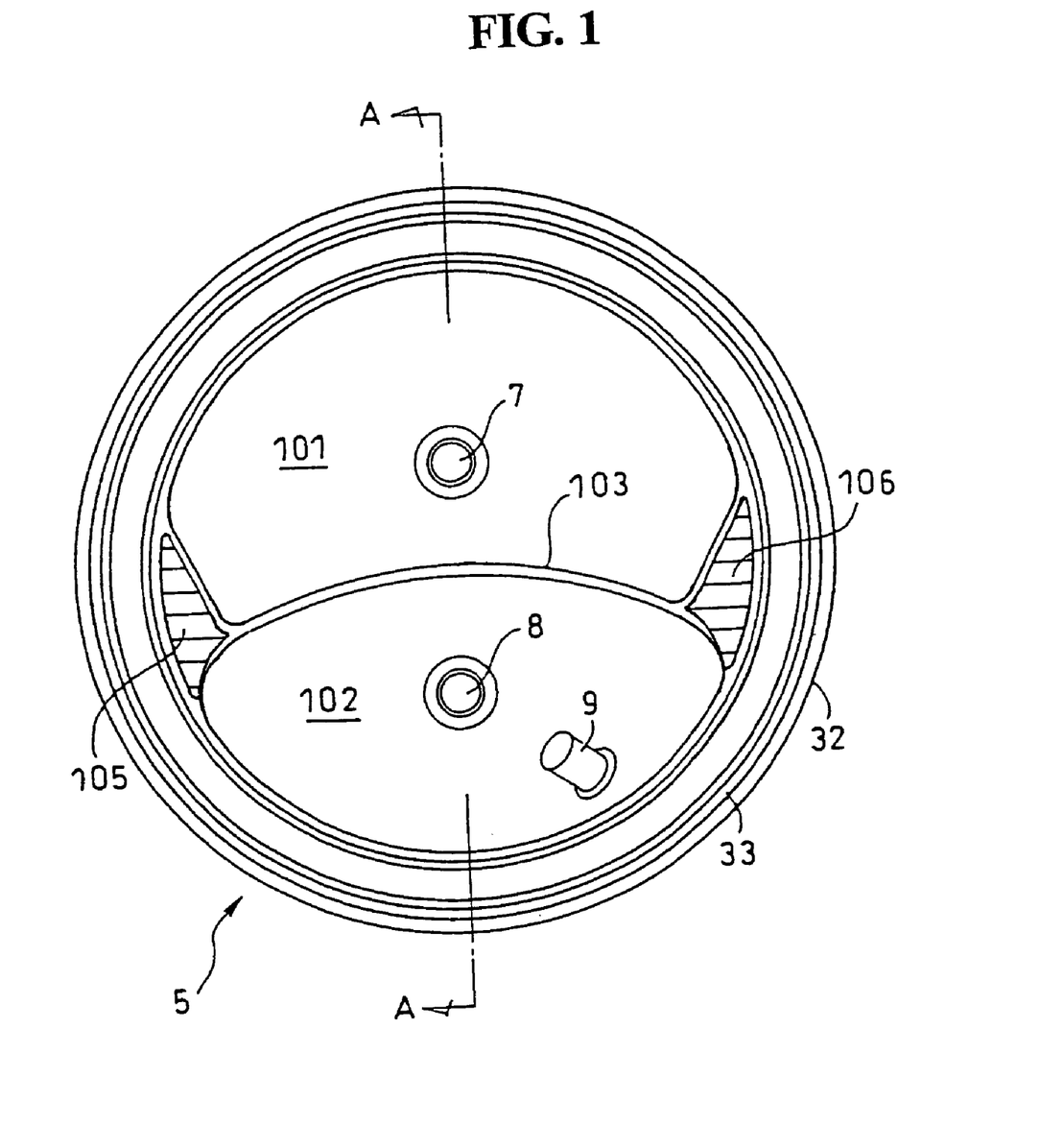
FIG. 1 is a front view of a headlamp assembly according to a first embodiment of the present invention.
Figure 3:
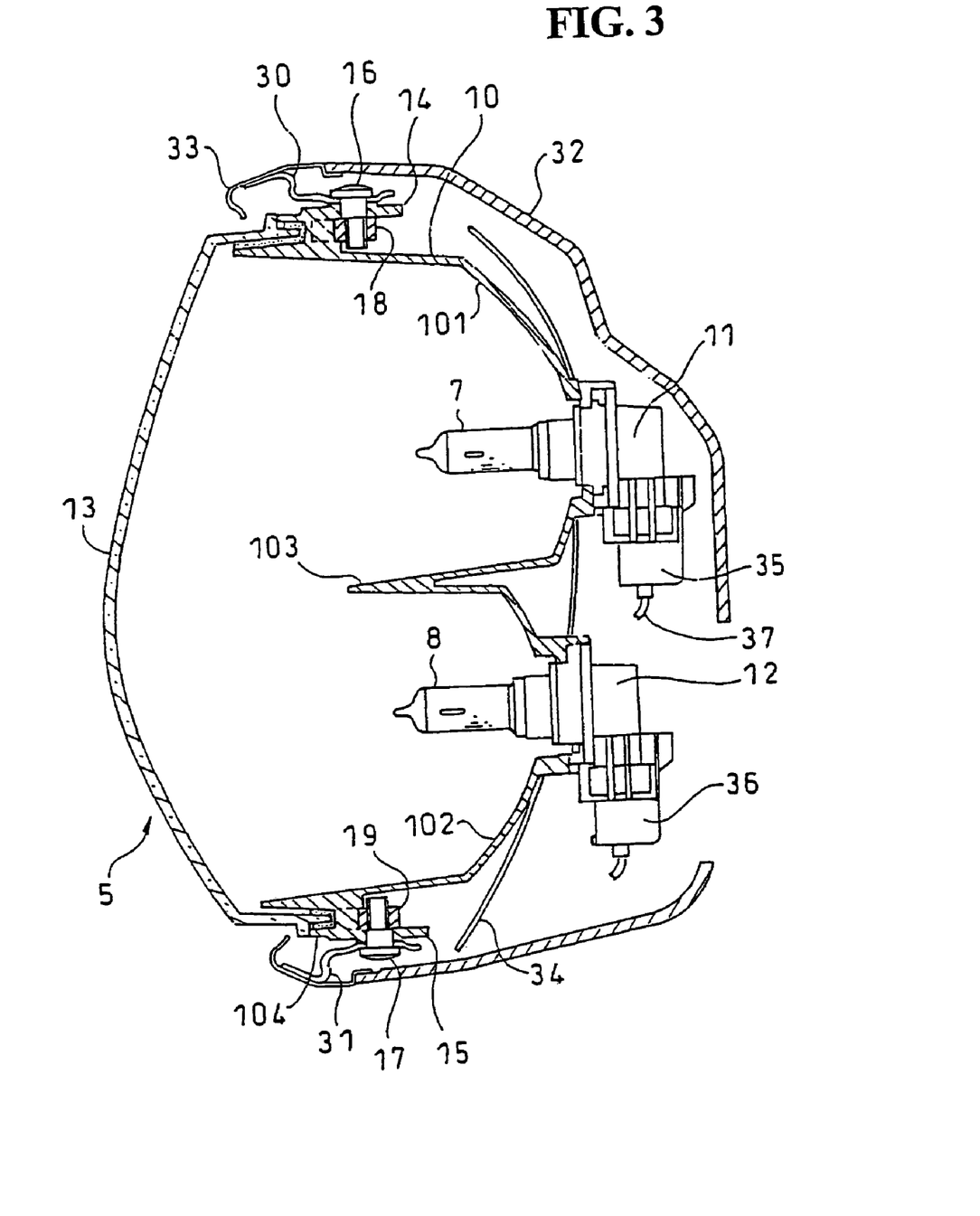
FIG. 3 is a sectional view taken on line A—A in FIG. 1.
Figure 4:
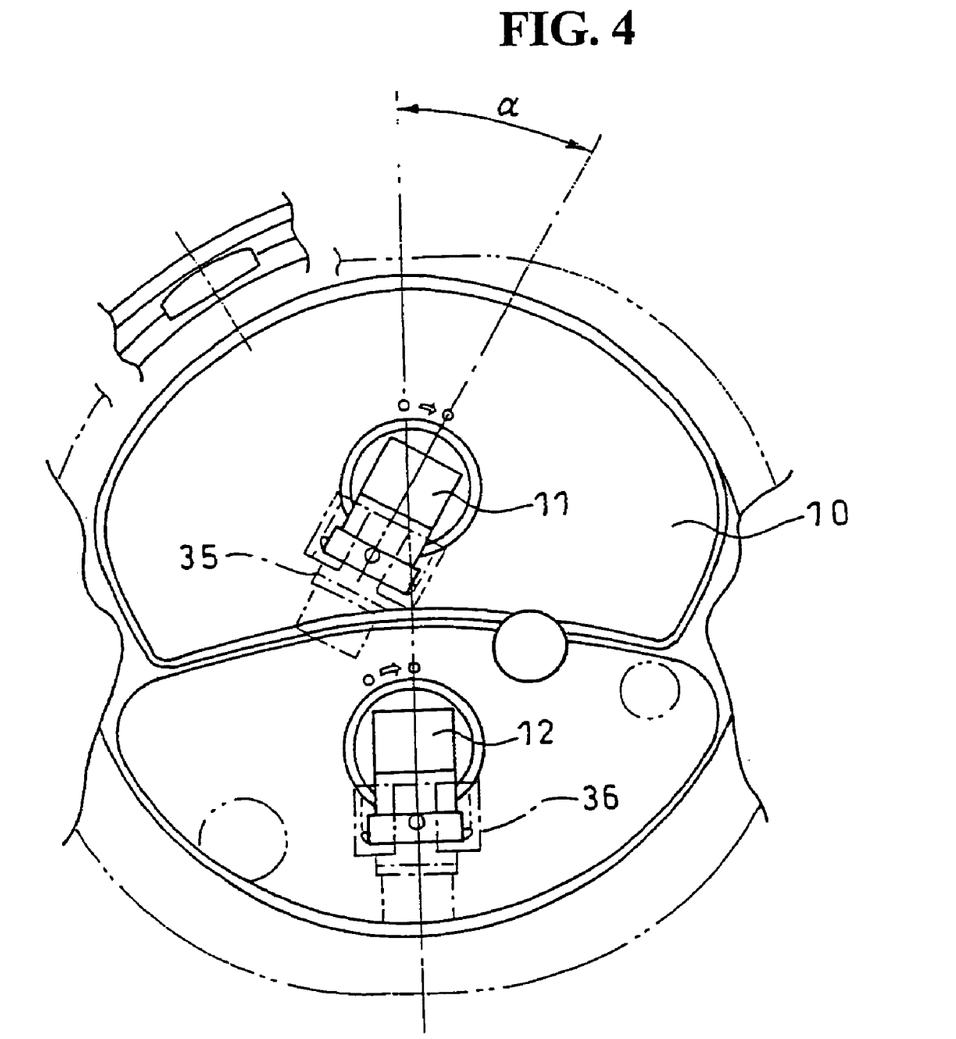
FIG. 4 is a rear view of the headlamp assembly of the first embodiment.

The construction of the headlamp assembly will now be described in detail. FIG. 1 is a front view of the headlamp assembly, FIG. 3 is a sectional view taken on line A—A in FIG. 1, and FIG. 4 is a rear view of the headlamp assembly (with the case removed). In these figures, the headlamp assembly 5 has two main electric bulbs 7, 8 and one sub-electric bulb, position lamp 9. The headlamp is mounted on the vehicle body in such a manner that the main electric bulbs 7 and 8 assume upper and lower positions, respectively. The main bulb 7 is for a low beam and the main bulb 8 is for a high beam. During normal operation of the vehicle, only the main bulb 7 (i.e., low beam) is illuminated. When it is desired to illuminate the front more brightly, both the main bulb 8 for the high beam and the main bulb 7 for the low beam are illuminated. The main bulbs 7 and 8 are secured to sockets 11 and 12, respectively, which are fixed to a reflector 10. The reflector 10 has a reflecting surface 101 for the low beam and a reflecting surface 102 for the high beam. These reflecting surfaces are shaped so as to collimate light generated by the main bulbs 7 and 8 and radiate the collimated light forwards of the vehicle body. A wall 103 is formed between the main bulbs 7 and 8 in order for the reflecting surfaces 101 and 102 to be independent of each other to thereby prevent mutual interference of the light.

A front edge of the reflector 10 includes a groove 104 having a shape which matches a rear edge of a lens 13. The lens 13 is fitted in the groove 104 and covers the front portion of the reflector 10. Seats 14 and 15 are formed in upper and lower positions, respectively, of the reflector 10, and holes are formed in the seats 14 and 15 so as to permit the passage therethrough of bolts 16 and 17. The bolts 16 and 17, which are inserted through the holes, are brought into threaded engagement with nuts 18 and 19 to fix stays 30 and 31 to the seats 14 and 15, respectively. The stays 30 and 31 are formed of steel.

The case 32 is formed of resin in the shape of a bowl so that it can cover the reflector 10 from behind.

A metallic annular rim 33 is fitted in a front edge of the case 32. The annular rim 33 is clamped using screws (not shown). A front portion of the annular rim 33 is bent inwardly in the shape of a hook and is engaged with the stays 30 and 31. The rim 33 and the stays 30, 31 are fixed to each other by virtue of the outward elasticity of the stays.

Behind the reflector 10, that is, between the reflector 10 and the case 32 positioned behind the reflection, there is mounted a heat insulating plate 34 which shields the heat of the reflector 10 from being transmitted to the case 32. The heat insulating plate 34 is formed of rubber.

In FIGS. 3 and 4, the sockets 11 and 12 of the main bulbs do not extend rearwardly along optical axes of the main bulbs 7 and 8 but are bent perpendicularly to the optical axes. Couplers 35 and 36 are connected to end portions of the sockets 11 and 12. If an electric wire 37 extending from the coupler 35 is drawn out toward the lower socket 12, it will interfere with the socket 12, so it is preferable to avoid such an interference. Therefore, in order that the electric wire drawn out through the coupler 35 may not be directed to the socket 12, the socket 11 is fixed to a rear portion of the reflector 10 at a position deflected by a predetermined angle α.

More specifically, the socket 11 is inserted into a hole formed in the rear portion of the reflector 10 so that the bent portion of the socket 11 is directed to the socket 12. A cam surface, i.e., inclined surface, is formed so that the socket 11 is fixed to the reflector 10 at a clockwise twisted position by the angle α from its inserted position. It is optional on which side of the socket 11 and the reflector 10 the inclined surface is to be formed.

Figure 5:
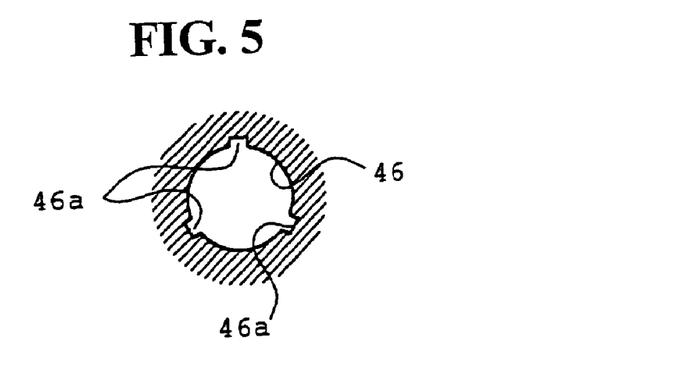
FIG. 5 is a front view showing a bulb socket hole formed in a reflector.
Figure 6:
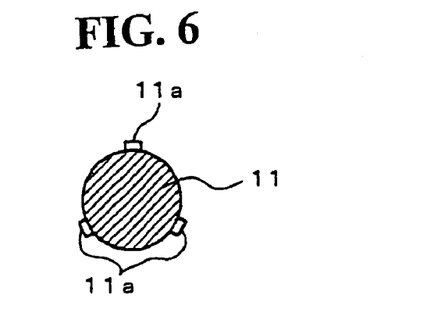
FIG. 6 is a sectional view of a bulb socket.
Figure 7:
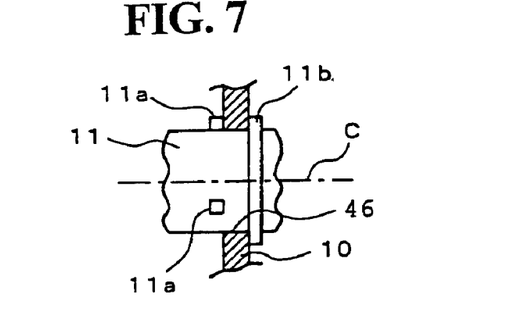
FIG. 7 illustrates an engaged state of the reflector and the bulb socket.

FIG. 5 illustrates a hole formed in the reflector 10 for insertion therein of the socket 11, FIG. 6 is a sectional view of a principal portion of the socket 11, and FIG. 7 is a sectional view of a principal portion of the reflector with the socket 11 secured thereto. The socket 12 and a hole 47 of the reflector 10 into which the socket 12 is inserted are also formed in the same manner.

The hole 46 has at least three cutout portions 46a formed in an inner periphery thereof. On the other hand, the socket 11 has engaging portions 11a formed at intervals at which the engaging portions are fitted in the cutout portions 46a. Sizes of various portions are determined so that the engaging portions 11a and a flange 11b of the socket 11 hold therebetween the peripheral edge of the hole 46 of the reflector when the socket 11 is inserted into the hole 46 with the engaging portions 11a registered with the cutout portions 46a and when the socket 11 is turned at the angle α around an optical axis c.

Next, the shape of the reflector 10 will be described in more detail. As shown in FIG. 1, when the two reflecting surfaces 101 and 102 of the reflector 10 are seen from the front side, they present a centrally constricted "8" shape. Since this "8" shape does not coincide with the inside shape of the annular member 33 of the case 32, there are formed gaps between the shape and the case 32. To fill up the gaps, blindfold portions 105 and 106 project outwardly from the reflecting surfaces of the reflector 10.

If the surfaces of the blindfold portions 105 and 106 are left flat, the external form of the reflecting surfaces of the reflector 10 becomes indefinite, resulting in impairment of the appearance. If the blindfold portions 105 and 106 are coated black, it is possible to make a distinction with respect to the reflecting surfaces and the contours of the reflecting surfaces 101 and 102 become clear. However, this is not preferred because a coating step is added.

Figure 8:
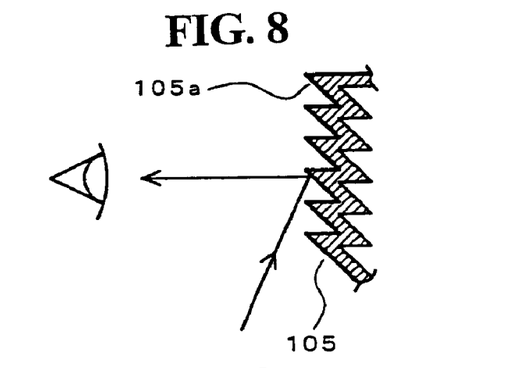
FIG. 8 is a sectional view of a blindfold member.

Therefore, some consideration was given to the surface shape of the blindfold portions 105 and 106 so that the blindfold portions looked black in appearance. FIG. 8 is a sectional view of the blindfold portion 105. The blindfold portion 106 is also formed like the blindfold portion 105. As shown in FIG. 8, a front surface of the blindfold portion 105 is made uneven, which uneven surface includes a downwardly inclined surface 105a. Through the surface 105a, light from the ground, i.e., light from a dark surface, is incident on the eyes of a person who views the headlamp from the front side. As a result, there is obtained an effect such that the blindfold portion 105 looks black in color that is different from the color of the reflecting surfaces 101 and 102.

Figure 9:
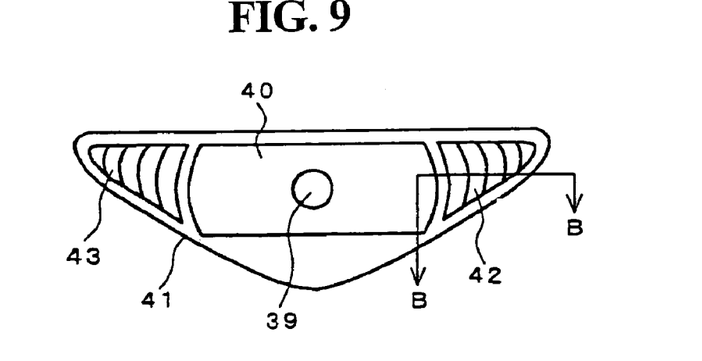
FIG. 9 is a front view of a headlamp assembly according to a second embodiment of the present invention.
Figure 10:
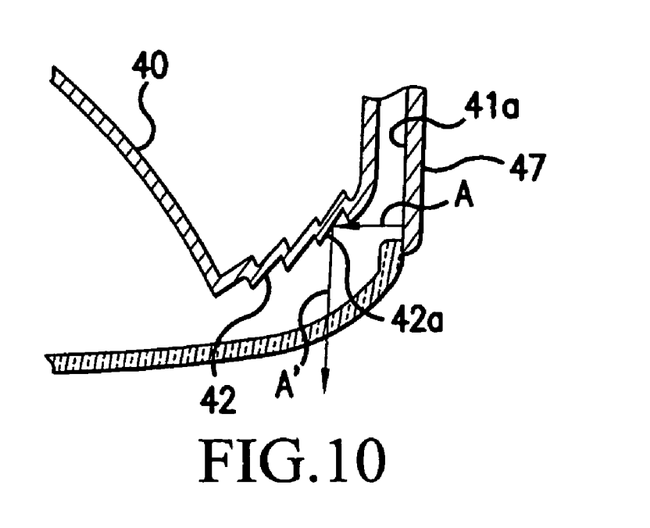
FIG. 10 is a sectional view taken on line B—B in FIG. 9.

FIG. 9 is a front view of a headlamp assembly according to a second embodiment of the present invention and FIG. 10 is a sectional view taken on line B—B in FIG. 9. In FIG. 9, a headlamp assembly 38 is centrally provided with one electric bulb 39, and on both right and left sides of a reflector 40 are disposed extensions 42 and 43 to fill gaps formed between the reflector 40 and a case 41. As shown in FIG. 9, the extension 42 (also true of 43) has an uneven surface. This uneven surface, when viewed from the front side, includes a plurality of faces 42a on which an inner wall 41a of the case 41 is projected. Therefore, if the inner wall 41a of the case 41 that projects light onto the faces 42a is colored in black, the extension 42 looks black when the headlamp assembly 38 is seen from the front side (as shown by arrows A, A'), whereby the shape of the central reflector 40 is clearly recognized.

It is possible to form the extension 42 (also true of the extension 43) as a separate member independently of the reflector 40. For example, in FIG. 11, the extension 43 lies on the front side of the case 41 and constitutes a part of the case. By blackening the inside of a peripheral portion 44a of a lens 44 which covers the extension 43, it is possible to let the uneven surface of the extension 43 look black.

Figure 11:
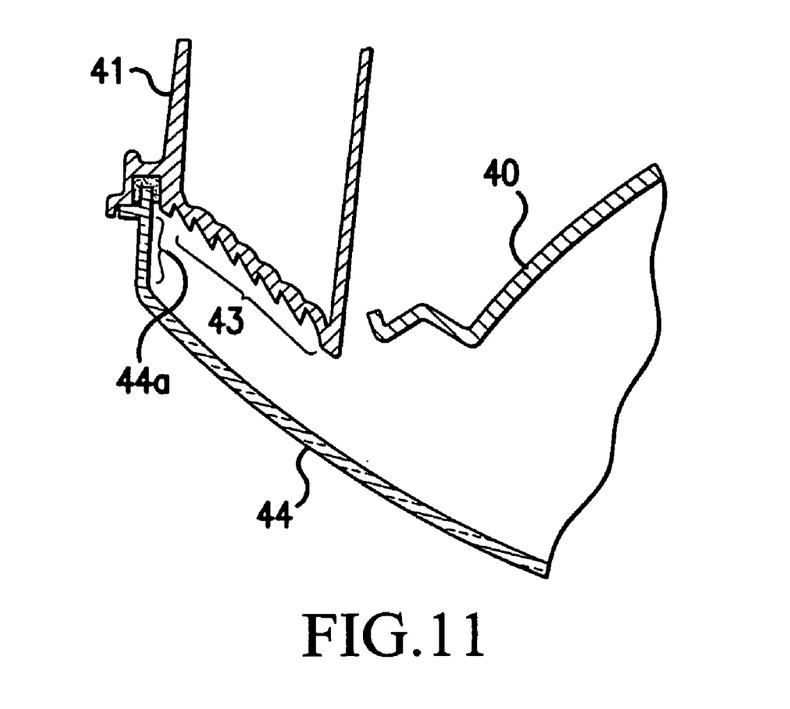
FIG. 11 is a sectional view of a principal portion of a headlamp assembly according to a modification of the second embodiment.

It is optional whether the extension 43 is to be formed integrally with or separately from the reflector 40 or the case 41. The front sides of the portions which blindfold the gaps between the reflecting surfaces of the reflector and the case to make the interior invisible are each formed with plural small portions having faces which make the blindfold portions look black when seen from the front.

Although the uneven surfaces of the blindfold portions shown in the previous first embodiment are set at such an angle as to conduct light from below to forward of the vehicle, the setting of the angle may be modified so as to conduct light from the inner surface of the case to be forward of the vehicle. That is, there may be adopted the same angle setting as that of the extension shown in FIG. 8. In this case, the inner surface of the case 32 and/or the annular member 33 is made black in color. Although it is preferable that the inside of the case is black, no limitation is made to black. Another color may be used, including brown or dark gray for example, insofar as the light reflected by the blindfold members or the extensions gives a darker impression than the light reflected by the reflecting surfaces of the reflector and there is created a contrast with the reflecting surfaces of the reflector.

According to the present invention, as is apparent from the above description, the blindfold members which fill the gaps formed between the reflector and the case to blindfold the interior of the case look black or dark in color when seen from the front side of the vehicle. With the resulting contrast with the reflecting surfaces of the reflector, the shape of the reflecting surfaces can be made conspicuous and hence it is possible to provide a headlamp assembly having a simple appearance.

According to the present invention, the blindfold members reflect light from below, i.e., light from the ground, forwards and can look black thereby.

According to the present invention, since the reflector has two reflecting surfaces, in a headlamp assembly wherein the reflecting surface shape does not coincide with the case front shape, the blindfold members which blindfold gaps formed in morphologically inconsistent portions can be made look black.

According to the present invention, the inner surface of the case, i.e., a black or dark portion, can project on the surface of the blindfold members, thereby permitting the blindfold members to look black.

According to the present invention, the reflector and the blindfold members can be formed by monolithic molding for example. Therefore, unlike forming blindfold members separately from the reflector, for example as extensions, it is possible to reduce the number of parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A headlamp assembly for a vehicle, comprising:
   an electric bulb;
   a reflector having a reflecting surface for reflecting light in a predetermined irradiating direction which light is generated by said electric bulb;
   a lens provided on a front side of said reflector;
   a case disposed so as to enclose a rear portion of said reflector and supporting the reflector;
   a blindfold member is provided to fill a gap which is formed between said case and said reflector when viewed from the front side; and
   a reflecting surface is formed on a front side of said blindfold member at an angle which is set so that light received from below is conducted in a forward direction with respect to the vehicle,
   wherein said blindfold member is an uneven surface having ridges extending laterally with respect to the vehicle.

2. The headlamp assembly for a vehicle according to claim 1, wherein:
   two said electric bulbs are arranged vertically with respect to each other and said reflector has two reflecting surfaces arranged vertically with respect to each other for reflecting light in two different directions which light is generated by said electric bulbs, and wherein said two reflecting surfaces are constricted inwardly in a lateral direction adjacent to where they join each other, thus forming gaps between constricted portions and said case, and said blindfold member is disposed in gaps between the constricted portions and said case.

3. The headlamp assembly for a vehicle according to claim 2, wherein said blindfold member is integral with a front edge of said reflector.

4. The headlamp assembly for a vehicle according to claim 2, wherein said two reflecting surfaces of the reflector are an upper reflector and a lower reflector, and said blindfold member straddles between said upper reflector and said lower reflector.

5. The headlamp assembly for a vehicle according to claim 1, wherein said blindfold member is integral with a front edge of said reflector.

6. The headlamp assembly for a vehicle according claim 1, wherein said blindfold member said uneven surface is formed from a plurality of downwardly inclined surfaces.

7. A headlamp assembly for a vehicle, comprising:
an electric bulb;
a reflector having a reflecting surface for reflecting light in a predetermined irradiating direction which light is generated by said electric bulb;
a lens provided on a front side of said reflector;
a case having a colored inner surface disposed so as to enclose a rear portion of said reflector and supporting the reflector;
a blindfold member is provided to fill a gap which is formed between said case and said reflector when viewed from the front side, the blindfold member having a surface facing and straddling an area where a side edge of the lens is connected to the inner surface of the case,
wherein said surface of said blindfold is formed at such an angle so as to reflect the color of the inner surface of said case in a forward direction with respect to the vehicle, so that when the blindfold member is viewed from the front side of the headlamp, the blindfold member appears to have the color of the inner surface of the case.

8. The headlamp assembly for a vehicle according to claim 7, wherein the inner surface of said case is black in color.

9. The headlamp assembly for a vehicle according to claim 8, wherein said blindfold member is integral with a front edge of said reflector.

10. The headlamp assembly for a vehicle according to claim 7, wherein said blindfold member is integral with a front edge of said reflector.

11. A headlamp assembly for a vehicle, comprising:
a reflector having two reflecting surfaces for reflecting light in a predetermined irradiating direction;
a lens provided on a front side of said reflector;
a case disposed so as to enclose a rear portion of said reflector and supporting the reflector;
a blindfold member for filling a gap formed between said case and said reflector when viewed from the front side; and
a reflecting surface formed on a front side of said blindfold member at an angle which is set so that light received from below is conducted in a forward direction with respect to the vehicle,
wherein said two reflecting surfaces of the reflector are an upper reflector and a lower reflector, and said blindfold member straddles between said upper reflector and said lower reflector.

12. The headlamp assembly for a vehicle according to claim 11, and further including:
two electric bulbs are arranged vertically with respect to each other and said reflector has two reflecting surfaces arranged vertically with respect to each other for reflecting light in two different directions which light is generated by said electric bulbs, and
wherein said two reflecting surfaces are constricted inwardly in a lateral direction adjacent to where they join each other, thus forming gaps between constricted portions and said case, and said blindfold member is disposed in gaps between the constricted portions and said case.

13. The headlamp assembly for a vehicle according to claim 12, wherein said blindfold member is integral with a front edge of said reflector.

14. The headlamp assembly for a vehicle according to claim 11, wherein said blindfold member is integral with a front edge of said reflector.

15. The headlamp assembly for a vehicle according to claim 11, wherein said blindfold member is an uneven surface having ridges extending laterally with respect to the vehicle.

16. The headlamp assembly for a vehicle according to claim 15, wherein said blindfold member said uneven surface is formed from a plurality of downwardly inclined surfaces.

17. A headlamp assembly for a vehicle, comprising:
a reflector having a reflecting surface for reflecting light in a predetermined irradiating direction;
a lens provided on a front side of said reflector;
a case having a colored inner surface disposed so as to enclose a rear portion of said reflector and supporting the reflector;
a blindfold member is provided to fill a gap which is formed between said case and said reflector when viewed from the front side, the blindfold member having a surface facing and straddling an area where a side edge of the lens is connected to the inner surface of the case,
wherein said surface of said blindfold is formed at such an angle so as to reflect the color of the inner surface of said case in a forward direction with respect to the vehicle, so that when the blindfold member is viewed from the front side of the headlamp, the blindfold member appears to have the color of the inner surface of the case.

18. The headlamp assembly for a vehicle according to claim 17, wherein the inner surface of said case is black in color.

19. The headlamp assembly for a vehicle according to claim 18, wherein said blindfold member is integral with a front edge of said reflector.

20. The headlamp assembly for a vehicle according to claim 17, wherein said blindfold member is integral with a front edge of said reflector.

* * * * *